United States Patent
Lin et al.

(10) Patent No.: US 9,436,788 B2
(45) Date of Patent: Sep. 6, 2016

(54) METHOD OF FABRICATING AN INTEGRATED CIRCUIT WITH BLOCK DUMMY FOR OPTIMIZED PATTERN DENSITY UNIFORMITY

(71) Applicant: Taiwan Semiconductor Manufacturing Company, Ltd., Hsin-Chu (TW)

(72) Inventors: Jyuh-Fuh Lin, Miaoli County (TW); Pei-Yi Liu, Changhua County (TW); Cheng-Hung Chen, Hsinchu County (TW); Wen-Chuan Wang, Hsinchu (TW); Shy-Jay Lin, Hsinchu County (TW); Burn Jeng Lin, HsinChu (TW)

(73) Assignee: Taiwan Semiconductor Manufacturing Company, Ltd., Hsin-Chu (TW)

( * ) Notice: Subject to any disclaimer, the term of this patent is extended or adjusted under 35 U.S.C. 154(b) by 73 days.

(21) Appl. No.: 14/253,282

(22) Filed: Apr. 15, 2014

(65) Prior Publication Data

US 2015/0294057 A1   Oct. 15, 2015

(51) Int. Cl.
*G06F 17/50*   (2006.01)

(52) U.S. Cl.
CPC ....... *G06F 17/5068* (2013.01); *G06F 17/5009* (2013.01); *G06F 17/5081* (2013.01); *G06F 2217/12* (2013.01)

(58) Field of Classification Search
CPC ................................................... G06F 17/5068
See application file for complete search history.

(56) References Cited

U.S. PATENT DOCUMENTS

| | | | | |
|---|---|---|---|---|
| 5,636,133 | A * | 6/1997 | Chesebro ............ | G06F 17/5081 345/441 |
| 5,923,563 | A * | 7/1999 | Lavin .................. | G06F 17/5081 716/54 |
| 2002/0086481 | A1* | 7/2002 | Tsai .................. | H01L 27/10867 438/243 |
| 2004/0069744 | A1* | 4/2004 | Morey-Chaisemartin | H01L 21/31053 216/38 |
| 2004/0262769 | A1* | 12/2004 | Park .................. | H01L 21/76897 257/758 |
| 2005/0001968 | A1* | 1/2005 | Yamazaki ............. | G02F 1/1345 349/152 |
| 2005/0177810 | A1* | 8/2005 | Heng ...................... | G03F 1/144 716/54 |
| 2007/0256039 | A1* | 11/2007 | White ................. | G06F 17/5068 716/51 |

* cited by examiner

*Primary Examiner* — Vuthe Siek
*Assistant Examiner* — Aric Lin
(74) *Attorney, Agent, or Firm* — Haynes and Boone, LLP

(57) ABSTRACT

The present disclosure provides one embodiment of an IC method that includes receiving an IC design layout including a plurality of main features; choosing isolation distances to the IC design layout; oversizing the main features according to each of the isolation distances; generating a space block layer for the each of the isolation distances by a Boolean operation according to oversized main features; choosing an optimized space block layer and an optimized block dummy density ratio of the IC design layout according to pattern density variation; generating dummy features in the optimized space block layer according to the optimized block dummy density ratio; and forming a tape-out data of the IC design layout including the main features and the dummy features, for IC fabrication.

19 Claims, 13 Drawing Sheets

METHOD OF FABRICATING AN INTEGRATED CIRCUIT WITH BLOCK DUMMY FOR OPTIMIZED PATTERN DENSITY UNIFORMITY

CROSS-REFERENCE

This application is related to U.S. Ser. No. 14/252,464 filed Apr. 14, 2014, as "Method Of Fabricating An Integrated Circuit With Optimized Pattern Density Uniformity," which is hereby incorporated by reference in its entirety.

BACKGROUND

The integrated circuit (IC) design is more challenging when semiconductor technologies are continually progressing to smaller feature sizes, such as 45 nanometers, 28 nanometers, and below. The performance of a chip design is seriously influenced by the control of resistance/capacitance (RC), timing, leakage, and topology of the metal/dielectric inter-layers. Those are further related to resolution of the lithography patterning and the imaging accuracy.

To enhance the imaging effect when a design pattern is transferred to a wafer, an optical proximity correction (OPC) to minimize the proximity effect is indispensable. Assist features are added to an IC pattern to improve the imaging resolution of the IC pattern during a lithography patterning process.

In other side, during the semiconductor fabrication, a chemical mechanical polishing (CMP) process is applied to the wafer for polishing back and globally planarizing wafer surface. CMP involves both mechanical grinding and chemical etching in the material removal process. However, because the removal rates of different materials (such as metal and dielectric material) are usually different, polishing selectivity leads to undesirable dishing and erosion effects. Dishing occurs when the copper recedes below or protrudes above the level of the adjacent dielectric. Erosion is a localized thinning of the dielectric. In this case, dummy features are inserted into the IC pattern to enhance the CMP performance.

However, along with the progress of semiconductor technology, the feature sizes are getting smaller and smaller. The existing methods to add various dummy features have limited degree of freedom and effectiveness to tune the pattern density and poor uniformity of the pattern density. Especially, this presents more issues, such as spatial charging effect and micro-loading effect, when an electron-beam lithography technology is used to form the IC pattern. Furthermore, during the process to insert dummy features, various simulations and calculations associated with the dummy features take more time, causing the increase of the cost.

Therefore, what is needed is a method for IC design and mask making to effectively and efficiently adjusting an IC pattern to address the above issues.

BRIEF DESCRIPTION OF THE DRAWINGS

Aspects of the present disclosure are best understood from the following detailed description when read in association with the accompanying figures. It is noted that, in accordance with the standard practice in the industry, various features in the drawings are not drawn to scale. In fact, the dimensions of illustrated features may be arbitrarily increased or decreased for clarity of discussion.

DETAILED DESCRIPTION

Figure 1:
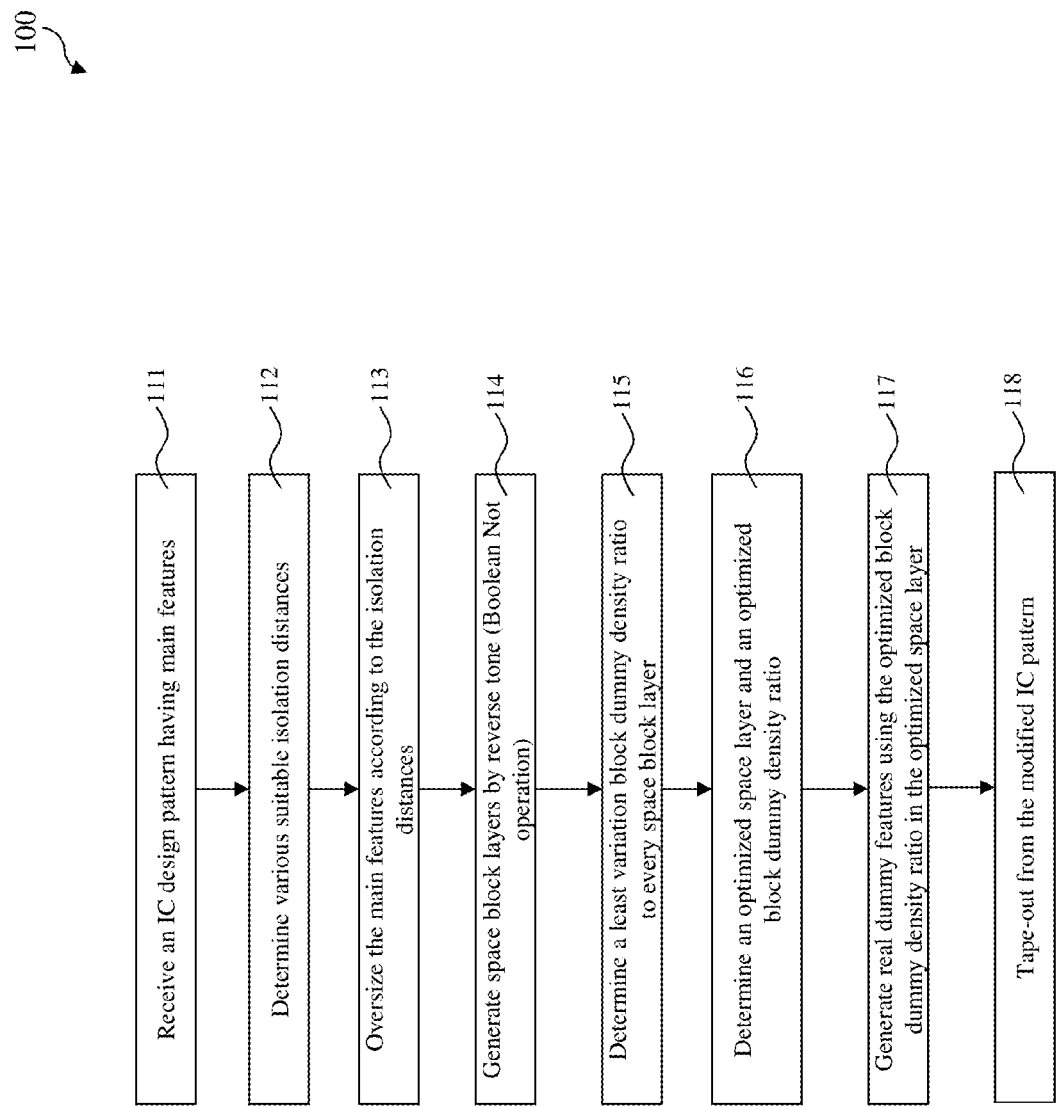
FIG. 1 is a flowchart of an embodiment of an integrated circuit (IC) method constructed according to aspects of the present disclosure.

It is understood that the following disclosure provides many different embodiments, or examples, for implementing different features of the invention. Specific examples of components and arrangements are described below to simplify the present disclosure. These are, of course, merely examples and are not intended to be limiting. The present disclosure may repeat reference numerals and/or letters in the various examples. This repetition is for the purpose of simplicity and clarity and does not in itself dictate a relationship between the various embodiments and/or configurations discussed.

FIG. 1 is a flowchart of a method 100 for integrated circuit (IC) designing constructed according to various aspects of the present disclosure in one or more embodiments. The method 100 provides a procedure to effectively insert dummy features with optimized circuit performance, reduced processing time and improved dummy pattern uniformity. The dummy features are features added to the IC design pattern for various fabrication functions. In one embodiment, dummy features are added to the IC design pattern to vary pattern density to improve chemical mechanical polishing (CMP) process applied to a semiconductor substrate during IC fabrication. In another embodiment, dummy features are added to the IC design pattern to vary thermal effect to improve a thermal annealing process applied to the semiconductor substrate during IC fabrication. In yet another embodiment, dummy features are added to the IC design pattern to correct optical proximity effect and enhance the imaging resolution for a lithography patterning process applied to the semiconductor substrate during IC fabrication. Those dummy features are sub-resolution features (non-printable to the semiconductor substrate) and are also referred to as optical proximity correction (OPC) features. The method 100 is described with reference to FIGS. 1 through 15.

The method 100 begins at operation 111 by receiving an IC design layout, such as from a designer. In one example, the designer is a design house. In another example, the designer is a design team separated from a semiconductor manufacturer assigned for making IC products according to the IC design layout. In various embodiments, the semiconductor manufacturer is capable for making photomasks, semiconductor wafers, or both. The IC design layout includes various geometrical patterns designed for an IC product based on the specification of the IC product.

The IC design layout is presented in one or more data files having the information of geometrical patterns. In one example, the IC design layout is expressed in a "gds" format known in the art. The designer, based on the specification of the IC product to be manufactured, implements a proper design procedure to generate the IC design layout. The design procedure may include logic design, physical design, and place and route. As an example, a portion of the IC design layout includes various IC features (also referred to as main features), such as active region, gate electrode, source and drain, metal lines or contacts/via of the interlayer interconnect structure, and openings for bonding pads, to be formed on a semiconductor substrate (such as a silicon wafer) or on various material layers disposed over the semiconductor substrate. The IC design layout may include additional features, such as those features for imaging effect, processing enhancement, and/or mask identification information.

Figure 2:
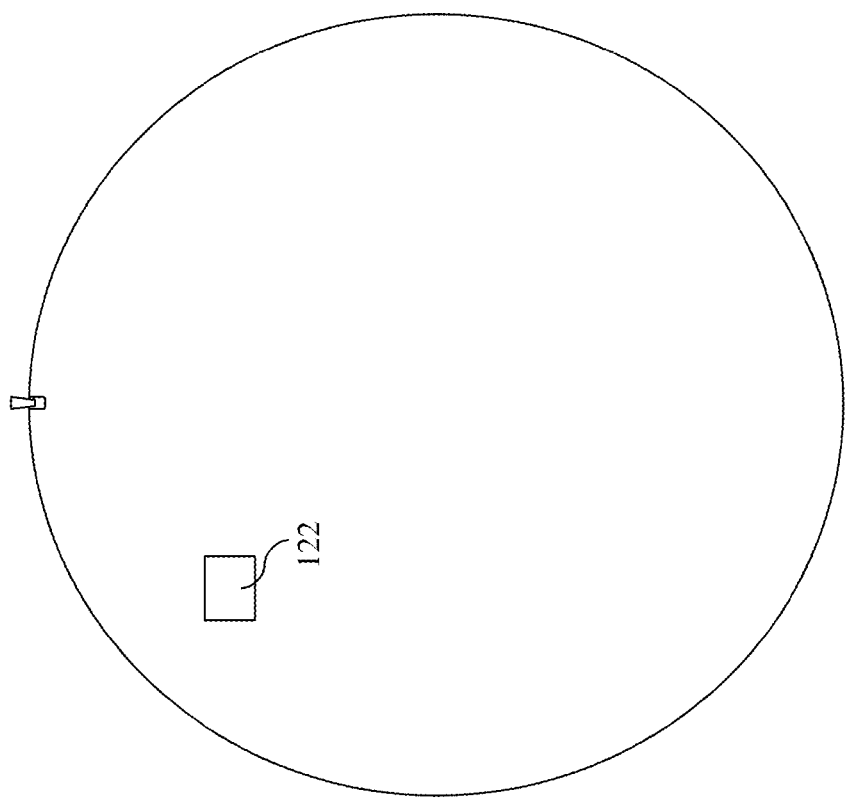
FIG. 2 is a schematic view of a semiconductor substrate constructed according to aspects of the present disclosure in one embodiment.

FIG. 2 illustrates a schematic view of a semiconductor substrate 120 constructed according to one embodiment. In the present embodiment, the semiconductor substrate 120 is a semiconductor wafer, such as silicon wafer. In other embodiments, the semiconductor substrate 120 may alternatively or additionally include other semiconductor material, such as germanium (Ge), silicon germanium (SiGe), silicon carbide (SiC), indium arsenide (InAs), or indium phosphide (InP), or a suitable alloy semiconductor, such as silicon germanium carbide, gallium arsenic phosphide, or gallium indium phosphide. Alternatively, the substrate 120 may include a non-semiconductor material such as a glass substrate for thin-film-transistor liquid crystal display (TFT-LCD) devices. The semiconductor substrate 120 may include various doped regions, dielectric features, and multilevel interconnects. In one embodiment, the substrate 120 includes various doped features for various microelectronic components, such as a complementary metal-oxide-semiconductor field-effect transistor (CMOSFET), imaging sensor, memory cell, and/or capacitive element. In another embodiment, the substrate 120 includes conductive material features and dielectric material features configured for coupling and isolating various microelectronic components, respectively. In another embodiment, the semiconductor substrate 120 includes one or more material layers (such as a dielectric material layer) formed thereon.

The semiconductor substrate 120 further includes various circuit regions (or IC chips) 122 defined for IC chips separated from each other by scribe lines. Integrated circuits are to be formed in the circuit regions 122. In one embodiment, the IC design layout is to be formed in each of the circuit regions 122.

Figure 3:
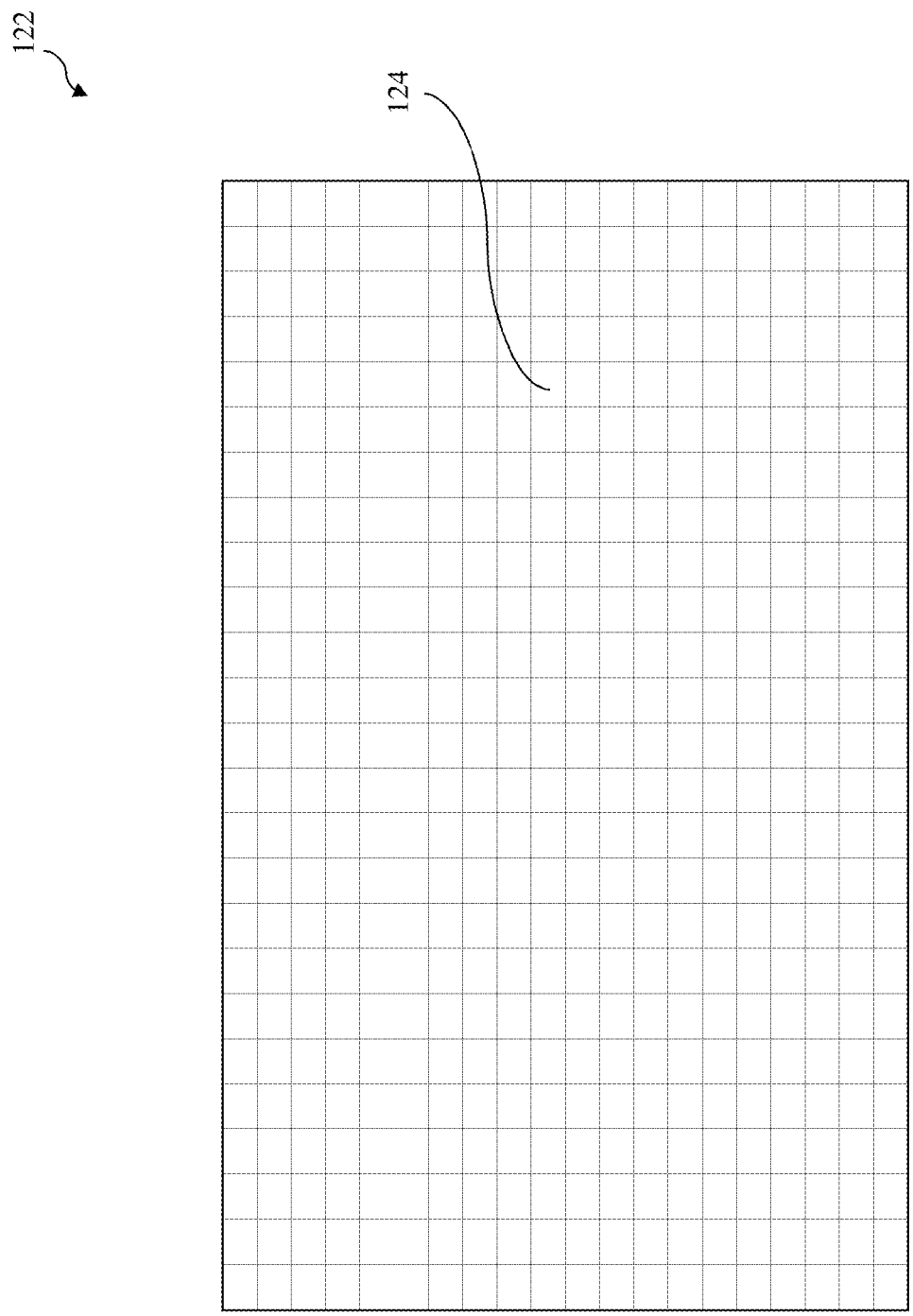
FIG. 3 is a schematic view of the semiconductor substrate of FIG. 2, in portion, constructed according to aspects of the present disclosure in one embodiment.

Referring to FIG. 3, each IC chip 122 is divided into a plurality of areas (also referred to templates) 124 for subsequent operations. In the present embodiment, the templates 124 have an equal area. The number of templates 124 in the full chip is "N". The templates 124 are referred to as 1, 2, 3, . . . , i, . . . and N, respectively. In the present example, each template 124 includes a rectangle or a square region in the semiconductor substrate 120.

The number N may be determined according to one or more factors, such as the calculation efficiency. When the number N is larger, the operations in the following process may take longer time. When the number N is smaller, the operations in the following process may take less time but limited optimization effectiveness. Accordingly, the number N is properly chosen according to one or more factors, such as engineer experience and/or previous processed data (such as historic data collected from execution of the method 100).

Figure 4:
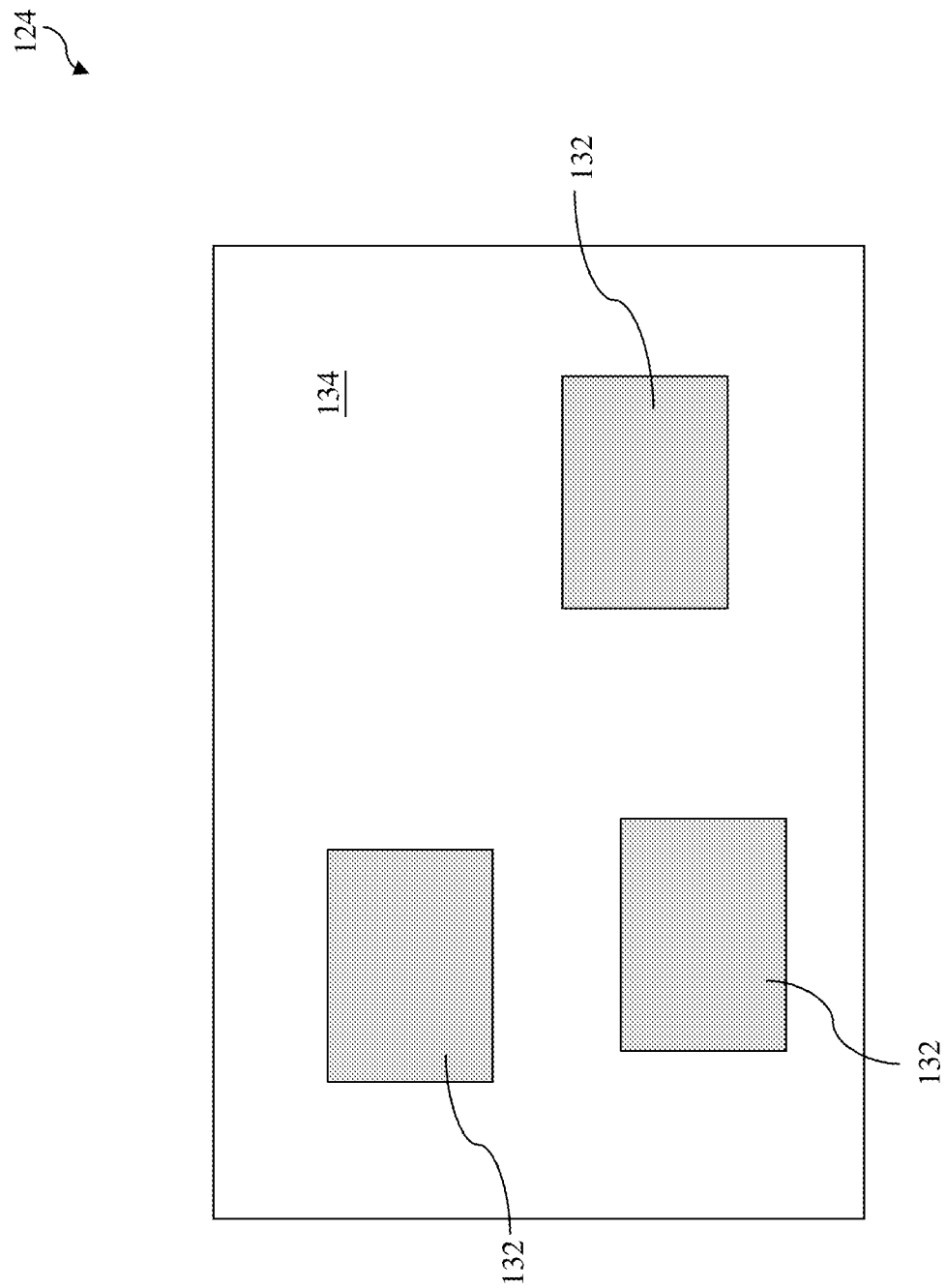
FIGS. 4-7 and 10 illustrate an integrated circuit (IC) design layout constructed according to aspects of the present disclosure in one embodiment.

The IC design layout to be formed on the chip is defined in various templates 124. Each template includes a portion of the IC design layout as illustrated in FIG. 4. The IC design layout defined in different templates may be different from each other, depending on individual integrated circuit and the corresponding IC design layout. The IC design layout includes main features 132 designed and configured to form a portion of the integrated circuit. A main feature is a geometrical pattern that defines an IC feature, such as contact/via hole, to be formed on the semiconductor substrate 120. The IC design layout also includes background regions 134 without main features. In the following description of the method 100, the IC design layout is described with the semiconductor substrate 120, even though the IC design layout is not yet transferred to the semiconductor substrate 120 during those operations stages of the method 100.

Figure 5:
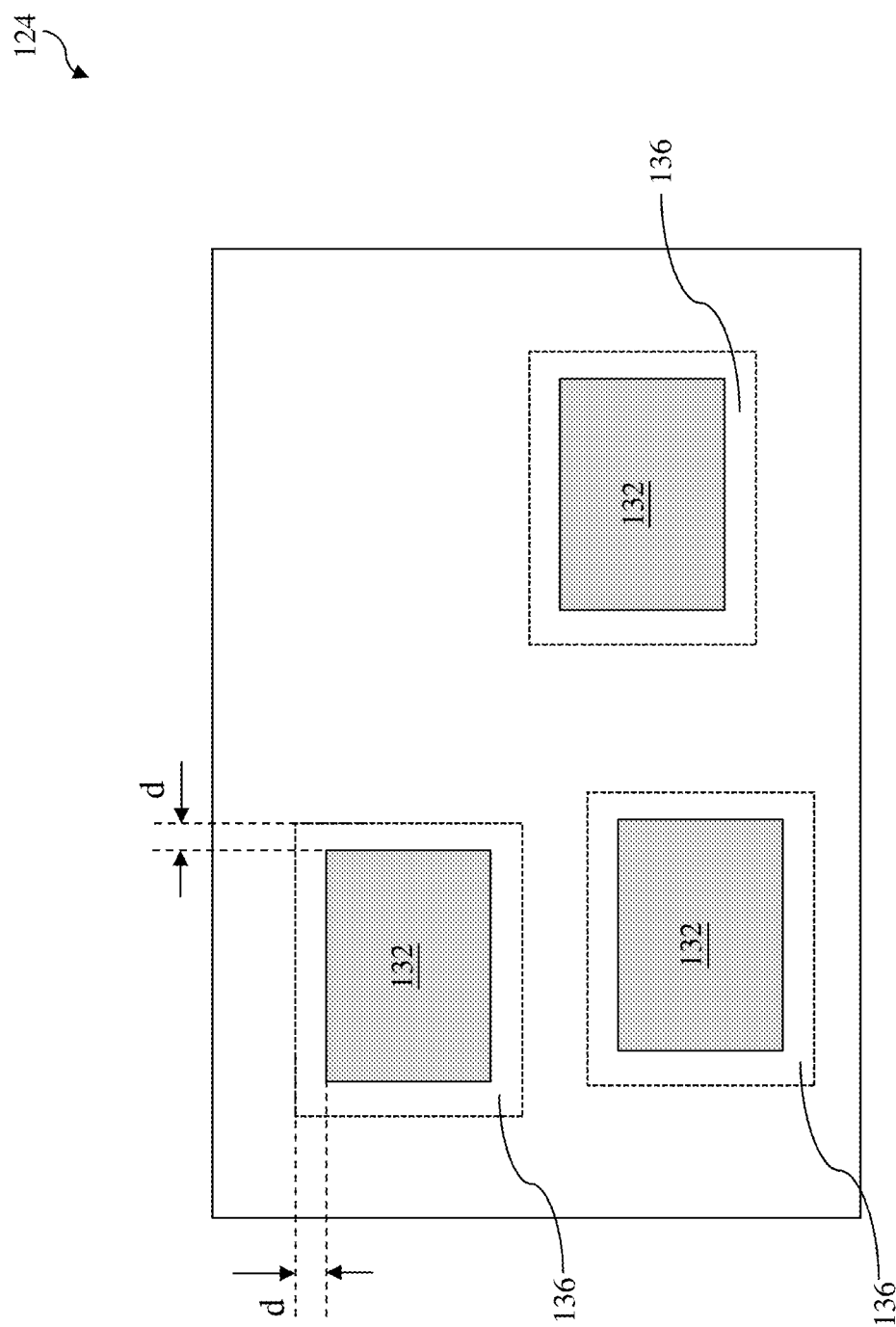

Referring to FIGS. 1 and 5, the method 100 proceeds to an operation 112 by determining suitable space isolation distances (or simply referred to as isolation distances), thereby generating space block layers.

As illustrated in FIG. 5, an isolation distance "d" is a parameter to define a forbidden area 136 surrounding a main feature 132, excluding dummy features from being inserted therein. The IC design layout in the template 124 includes a plurality of main features 132 and accordingly a plurality of forbidden areas 136 surrounding the respective main features 132.

The isolation distance d is constrained to be equal to or greater than a minimum isolation distance $d_{min}$, formulated as $d \geq d_{min}$. The minimum isolation distance $d_{min}$ is determined according to one or more factors, such as IC fabrication limitation. In various examples, the minimum isolation distance $d_{min}$ is determined by design rules or defect-free process window. The isolation distance d is chosen in a range equal to and greater than $d_{min}$ ($d \geq d_{min}$). Two or more suitable isolation distances are chosen according to the constraining of the minimum isolation distance $d_{min}$. Other factors may be further considered in choosing the isolation distance. In one embodiment, the plurality of the isolation distances are substantially equally distributed in a large range (in this case, the calculation time is reasonable but covering a large range for effective optimizing the dummy pattern. In one example, the isolation distances are chosen to be 5, 10, 15, and 20 nm.

Figure 6:
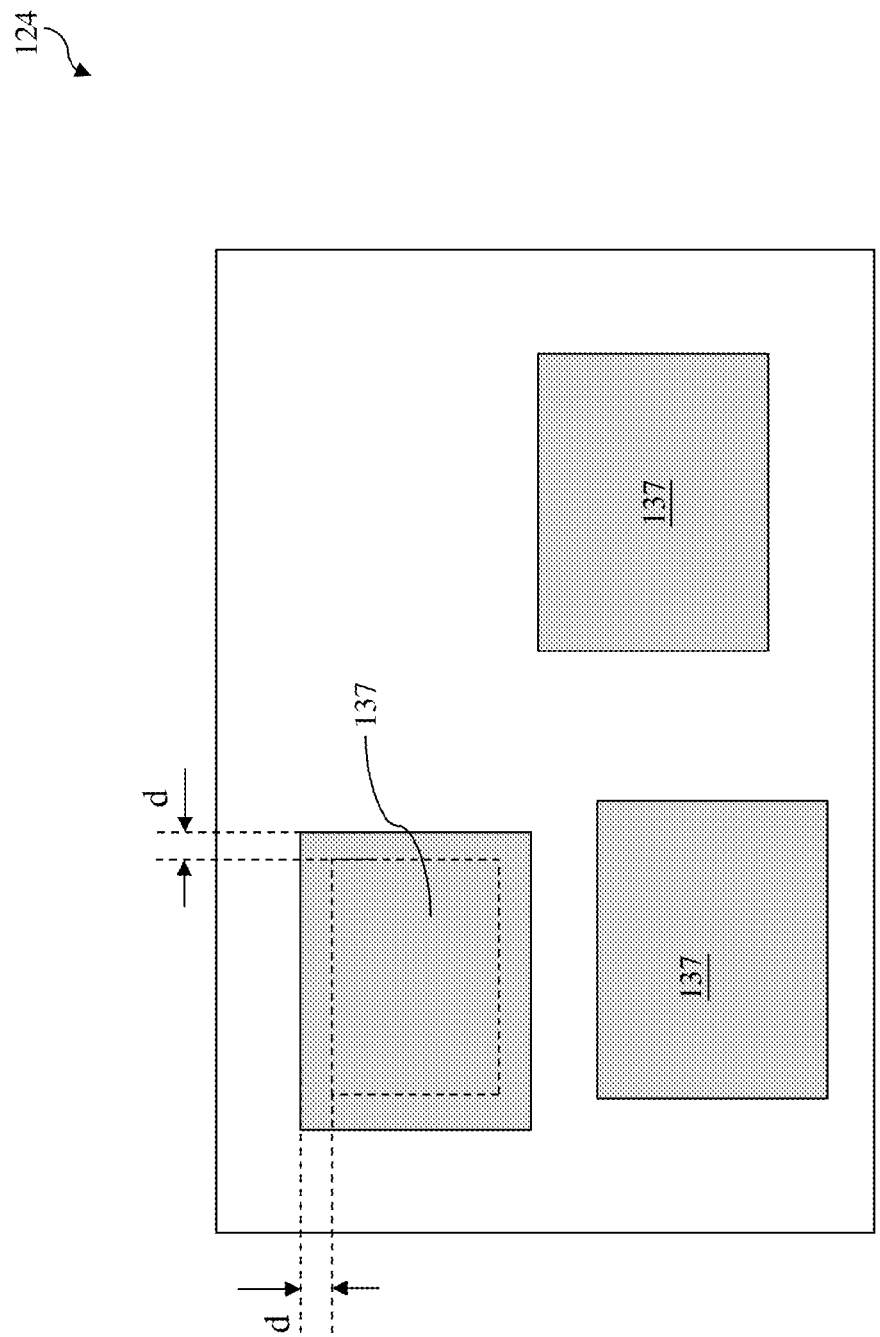

Referring to FIGS. 1 and 6, the method 100 proceeds to an operation 113 by oversizing the main features 132 according to the isolation distances. The oversized main features 137 are larger than the original main features 132 as illustrated in FIG. 6, where one of the original main features is illustrated by dashed lines for comparison. For various chosen isolation distances, an oversized main feature 137 is different due to different isolation distances. Thus generated IC design layouts are referred to derived IC design layouts each representing one generated IC design layout associated with one of the isolation distances.

Figure 7:
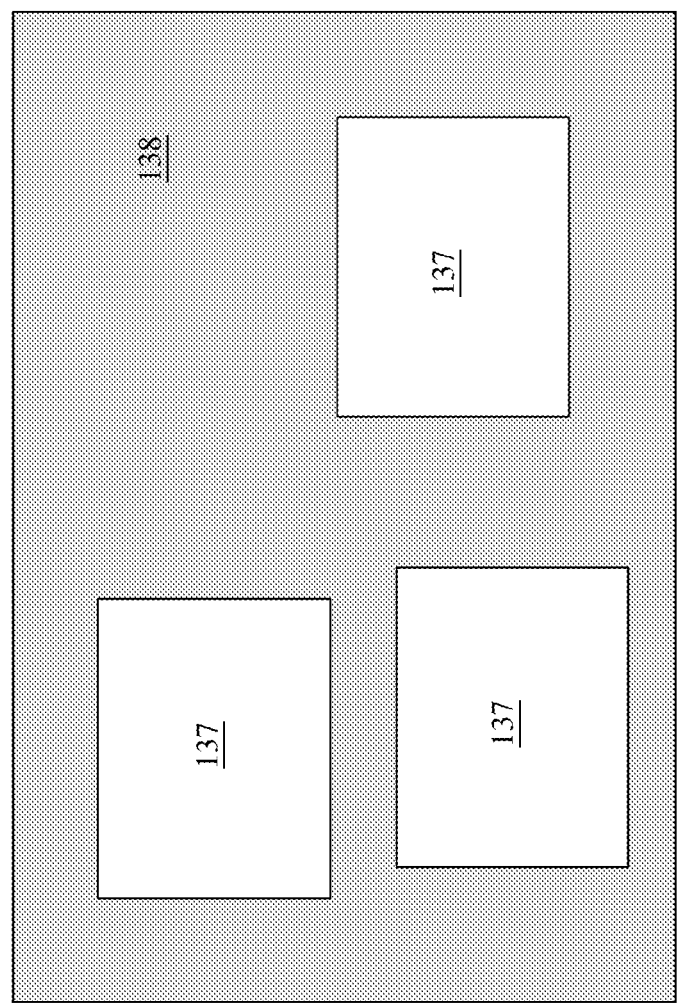

Referring to FIGS. 1 and 7, the method 100 proceeds to an operation 114 to generate space block layers (or simply space layers) by reversing tone (Boolean NOT operation) to the derived IC design layouts. In this operation, the regions for the oversized main features 137 are excluded; the rest region in the template 124 defines one or more space block(s) 138, as illustrated in FIG. 7. The operation 114 is a Boolean NOT operation, the oversized main features 137 are excluded, and any regions other than the oversized main features are chosen, which define the space blocks 138. The space blocks 138 associated with each isolation distance is collectively referred to as a space block layer. Since various suitable isolation distances are chosen, various space block layers are defined, each including corresponding space blocks 138.

Figure 9:
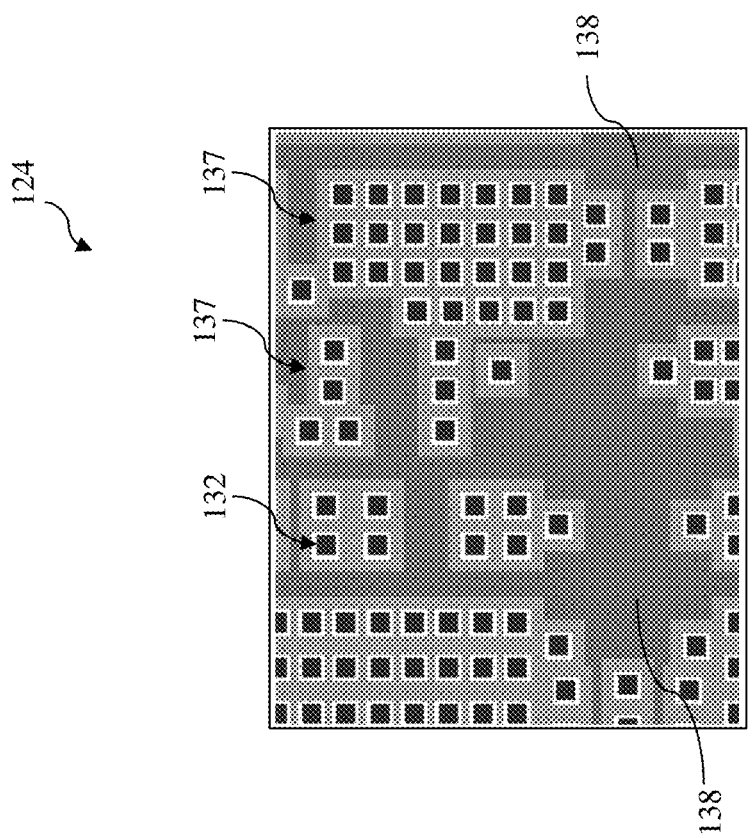
FIGS. 8 and 9 illustrate an integrated circuit (IC) design layout constructed according to aspects of the present disclosure in another embodiment.
Figure 8:
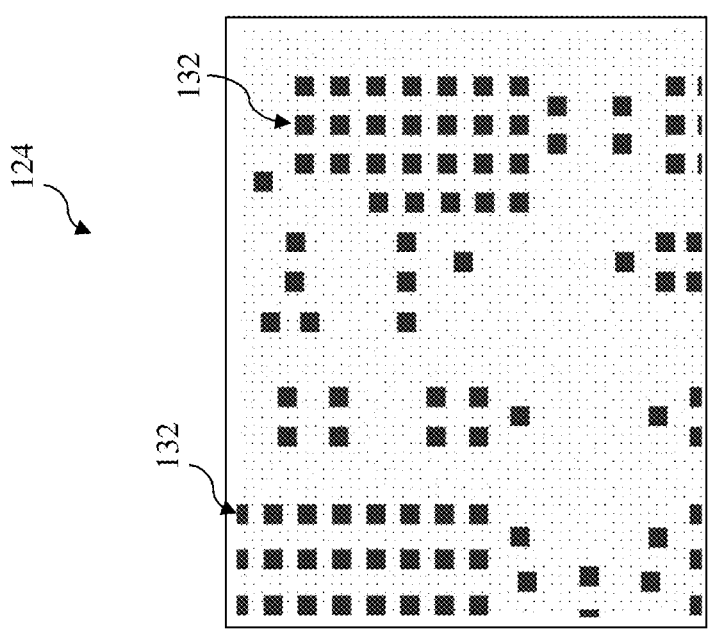

The operations 112 through 114 to generate space block layers are also illustrated in FIGS. 8 and 9 according to another example. The IC design layout in the template 124 includes a plurality of main features 132, as illustrated in FIG. 8. The main features 132 are oversized at operation 113 according to an isolation distance, thereby generating oversized main features 137. In the example, multiple main features 132 may coalesce to one oversized main feature 137. By reversing tone at the operation 114, the rest regions other than the oversized main features 137 are the space blocks 138.

The method 100 proceeds to an operation 115 by determining a pattern density weighting variable (also referred to as block dummy density ratio) associated with lease pattern density variation to every space block layer. In the current operation and the following operation 116, each of the space blocks 138 is treated as a dummy feature, even though the final dummy features may be different from the space blocks 138 and each space block may include multiple dummy features defined therein. Thereby, various simulations and calculations of the dummy pattern are more efficient and effective since a less number of the space blocks 138 are processed. However, each of the space blocks 138 is treated as a whole dummy feature but with a certain transmittance (a gray level) such that a space block is equivalent to the dummy features to be defined in the corresponding space block in term of final contribution to the total patent density (PD). The total pattern density PD in one template refers to the pattern density of various features, including main features and dummy features in that template. Therefore, when the pattern density of the space blocks 138 is $PD_s$, the real contribution of the space blocks 138 to the total pattern density is $r \cdot PD_s$, as formulated as $$PD = PD_0 + r \cdot PD_s(d). \quad \text{(equation 1)}$$

In the equation 1, $PD_0$ is the pattern density of the main features in one template and is also referred to as main pattern density. $PD_s$ is also referred to as block dummy pattern density (or simply dummy pattern density). The parameter "r" is a block dummy density ratio to all templates (1, 2, 3, ..., and N) of the semiconductor substrate 120. The dummy pattern density PD contributes to the total pattern density by $r \cdot PD_s$ instead of $PD_s$ since the space blocks 138 are generally not completely filled with dummy features. As block dummy density ratio, the parameter "r" is related to the filling ratio. As one example for better understanding the concept of the block dummy density ratio "r", assume that the dummy features occupies an area $S_f$ in the area $S_d$ of the space blocks 138 in a given template, the final contribution of the dummy features to the total pattern density in the given template is related to a ratio as $S_f/S_d$. In other words, the contribution of the dummy features to the total pattern density is $(S_f/S_d) \cdot PD_s$. The ratio $S_f/S_d$ is related to the block dummy density ratio "r" (or gray level). In the equation 1, the block dummy density ratio "r" is a weighting factor or a gray level of the space blocks in the template when each of those space blocks is treated as a dummy feature. The block dummy density ratio "r" has a value ranging between 0 and 1, as $0 \leq r \leq 1$. Again, the dummy features are not defined yet at this stage. Each of the space blocks 138 is treated as one dummy feature until real dummy features are determined at the operation 117. By this, various calculations and simulations for dummy insertion are more efficient since one space block is processed instead of a plurality of dummy features to be inserted in the space block. For example, the calculations of various pattern densities in the present operation are much faster.

The block dummy density ratio "r" is a universal parameter to various templates. A least variation block dummy density ratio (LVBDDR) "$r_0$" is determined for a given space block layer by the PDU statistical formula, $$r_0 = (\overline{PD_0 \cdot PD_s} - \overline{PD_0} \cdot \overline{PD_s})/\sigma_s^2 \quad \text{(equation 2)}$$

Various parameters in the equation 2 are further defined below. $\overline{PD_0}$ is the average main pattern density, as an average of the main pattern densities over various templates. Specifically, the average main pattern density $\overline{PD_0}$ is calculated by the following formula, $$\overline{PD_0} = [PD_0(1) + PD_0(2) + PD_0(3) + \ldots + PD_0(i) + \ldots + PD_0(N)]/N \quad \text{(equation 3)}$$

In which $PD_0(i)$ represents the main pattern density of the template "i". The average main pattern density $\overline{PD_0}$ remains the same for various space block layers.

Similarly, $\overline{PD_s}$ is the average dummy pattern density calculated by the following formula, $$\overline{PD_s} = [PD_s(1) + PD_s(2) + PD_s(3) + \ldots + PD_s(i) + \ldots + PD_s(N)]/N \quad \text{(equation 4)}$$

The average dummy pattern density $\overline{PD_s}$ is for the given space block layer and varies over different space block layers.

The term $\overline{PD_0 \cdot PD_s}$ is the average of the product $PD_0 \cdot PD_s$ over all templates (templates 1, 2, 3, ..., and N). The parameter $\sigma_s$ is the standard deviation of the dummy pattern density, defined as $$\sigma_s^2 = \overline{PD_s^2} - (\overline{PD_s})^2 \quad \text{(equation 5)}$$

where $\overline{PD_s^2}$ is the average of $PD_s^2$ over all templates and $\overline{PD_s}$ is the average of the dummy pattern density $PD_s$ over all templates. In operation 115, the LVBDDR is determined for each space block layer. The calculation of the LVBDDR is described in the patent application 2013-0868, the entire disclosures of those are hereby incorporated by reference.

The method 100 proceeds to operation 116 by choosing the space block layer (with the corresponding isolation distance d) and the block dummy density ratio "r" according to pattern density uniformity (specifically LVBDDR) and other factors, such as process window and throughput. Thus chosen space block layer (with the corresponding isolation distance d) and the block dummy density ratio "r" are referred to as the optimized space layer, and the optimized block dummy density ratio, respectively.

The pattern density uniformity is one factor to be considered. The LVBDDR "$r_0$" determined by the operation 107 maximizes the pattern density uniformity for the corresponding space block layer. However, when the block dummy density ratio "r" is close enough to $r_0$ in a certain range, it still provides acceptable pattern density uniformity and leaves a room for tuning other parameters, such as process window and throughput impact.

The throughput as another factor includes simulation time, the duration of the etch process to form the dummy features on the semiconductor substrate 120, and/or e-beam writing time during the e-beam lithography process to transfer the main features 132 and the dummy features to the semiconductor substrate 120.

The process window is a collection of values of process parameters that allow circuit to be manufactured under desired specifications. In one embodiment, the process window is one factor to be considered in determining a proper isolation distance "d" and the block dummy density ratio "r". In one example, the process window for the critical dimension (CD) is considered to ensure the CD is in the desired range. When the pattern density changes, the corresponding exposure intensity relative to the exposure threshold varies, causing CD variation. When the pattern density is higher or lower, the CD may be out of specification.

In another example where the dummy features are sub-resolution features for optical proximity correction (OPC) and are not printable in the semiconductor substrate 120, the process window is considered. When the dummy pattern density is too higher, the dummy features are printable. To avoid the situation where the dummy features are unexpectedly printable, a constrain of maximum dummy pattern density may be set up such that the corresponding exposure dose in the dummy blocks are less than the exposure threshold of the lithography exposure with a certain margin (e.g., 25% or higher).

With consideration all above factors, a space layer (and the corresponding isolation distance "d") and the block dummy density ratio "r" (close to "$r_0$" in the certain range) are chosen in the operation 116, as the optimized space block layer and the optimized block dummy density ratio.

Figure 10:
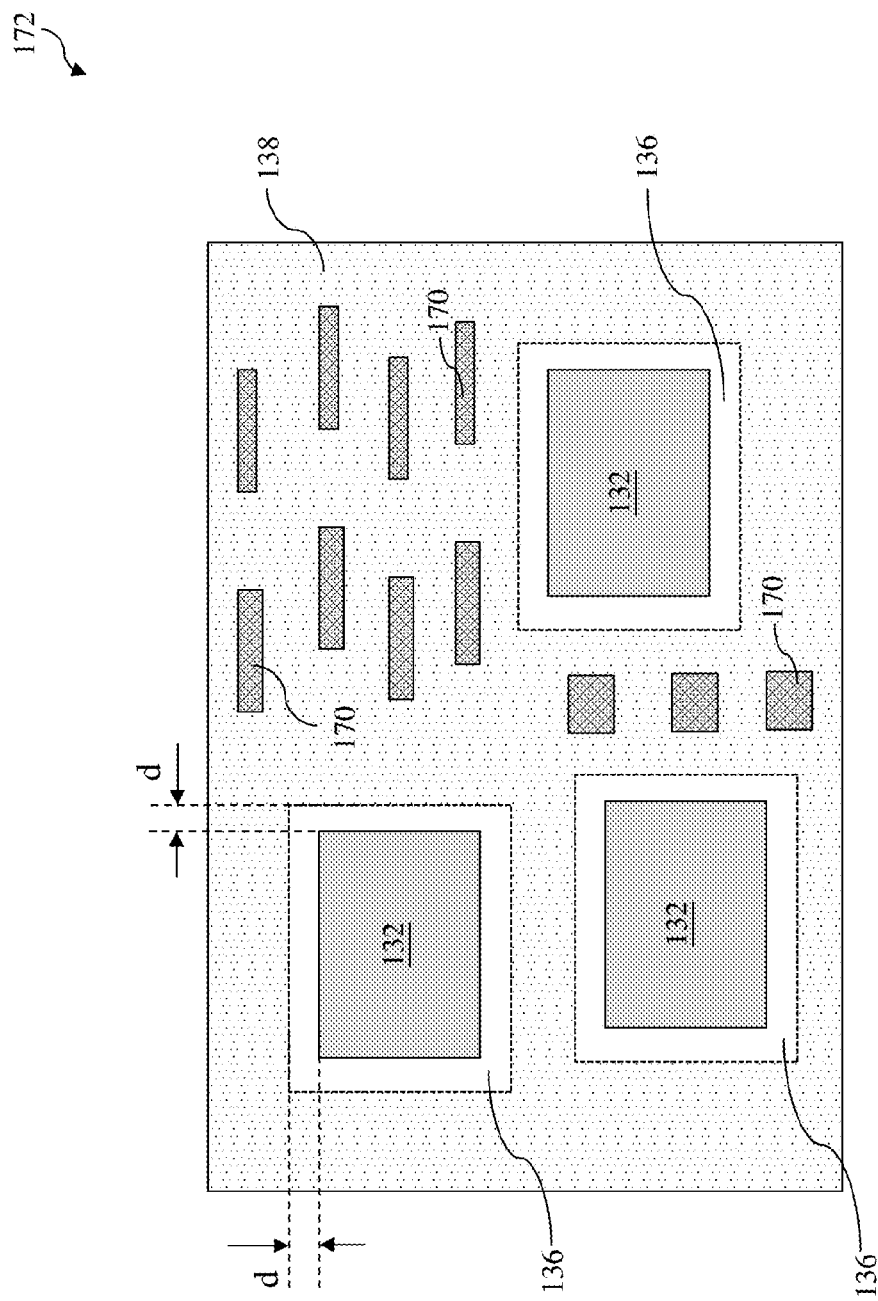

Referring to FIGS. 1 and 10, the method 100 proceeds to operation 117 by generating dummy features 170 in space blocks 138 according to the optimized block dummy density ratio in the optimized space block layer. The IC design layout including the main features 132 and the dummy features 170 are collectively referred to as a modified IC design layout 172 in FIG. 10.

In one embodiment, the dummy features 170 are generated in the space blocks 138 with a local dummy pattern density equal to the optimized block dummy density ratio "r", as illustrated in FIG. 10. The local dummy pattern density is defined as the total area $S_f$ of the dummy features to the total area $S_d$ of the space blocks 138 in one template 124, formulated as $S_f/S_d$. The dummy features 170 may be generated by a rule-based procedure. In furtherance of the present embodiment, the modified IC design layout 172 is used to form a mask for a photolithography exposure process that transfers the IC pattern into a photoresist layer coated on the semiconductor substrate 120.

The dummy features 170 may be designed into various suitable shapes, sizes and pitches. For examples, dummy features 170 are shaped into squares (as illustrated in FIG. 11), or rectangles (as illustrated in FIG. 12).

Figure 11:
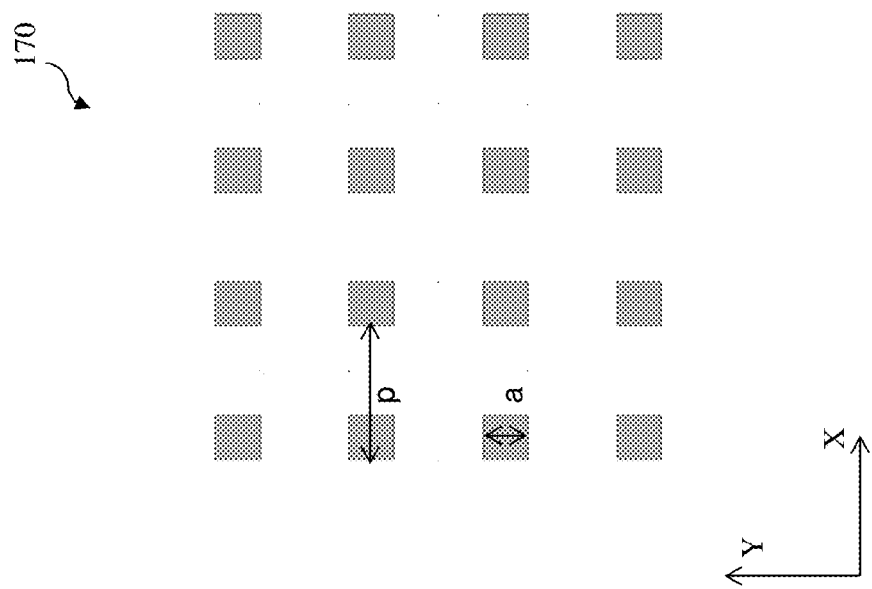

In FIG. 11, a plurality of dummy features 170 are configured in a two dimensional array in a space block. The dummy features 170 are squares with a side dimension "a". The dummy array has a periodic constant "p" (pitch) in both directions (X and Y directions). The pitch p and side dimension a are chosen such that $a^2/p^2=r$. The parameter r is the optimized block dummy density ratio.

Figure 12:
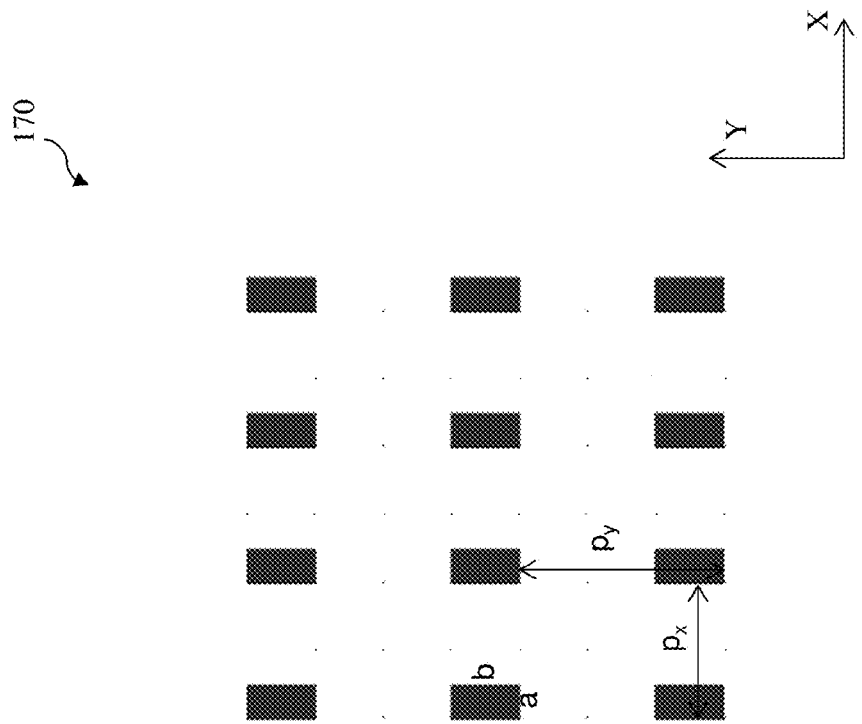
FIGS. 11-13 illustrate a dummy pattern of dummy features constructed according to aspects of the present disclosure in another embodiment.

In FIG. 12, a plurality of dummy features 170 are configured in a two dimensional array in a space block. The dummy features 170 are rectangles with side dimensions "a" and "b", respectively. The dummy array has a periodic constant "$p_x$" and "$p_y$" in X and Y directions, respectively. The pitches and side dimensions are chosen such that $ab/p_xp_y=r$.

Figure 13:
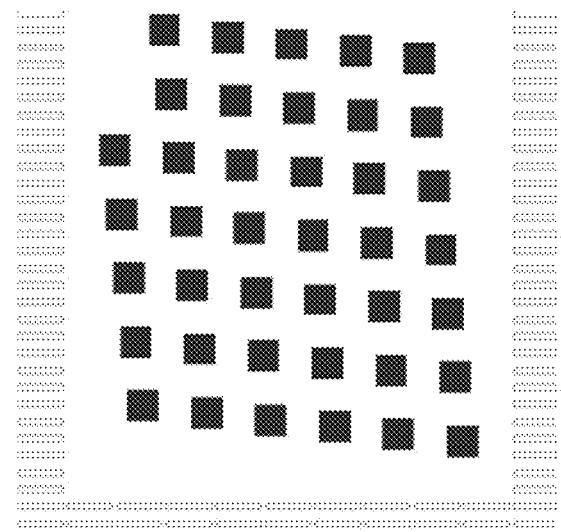

In other examples, the dummy features 170 are designed as positive dummy features (as island features when formed on the semiconductor substrate 120) or negative dummy features (as trench features when formed on the semiconductor substrate 120). Alternatively, the dummy features 170 may be configured to an irregular dummy array (as illustrated in FIG. 13).

In another embodiment where an electron-beam (e-beam) lithography system is used for transferring an IC pattern to an e-beam sensitive resist layer coated on the semiconductor substrate 120, the dummy features are simply those space blocks 138, as illustrated in FIG. 7. However, the lithography exposure dose to the space blocks 138 is less than the dose to the main features 132. The block dummy density ratio r is less than 1. In this case, the modified IC pattern 172 is defined with a variable exposure dose. In one embodiment, the resist layer is exposed by one e-beam lithography exposure process to expose different regions with respective doses. This is achievable because the e-beam lithography system is able to directly write with a variable dose. It is noted that the e-beam lithography exposing process may be implemented by a different e-beam exposure technology, such as digital pattern generator (DPG). In one embodiment, the IC pattern 172 is imaged on the resist layer using a DPG in a raster scan to control the respective dose to each region. In another embodiment, the IC pattern 172 is imaged on the resist layer by e-beam direct write in a raster mode. In yet another embodiment, the IC pattern 172 is imaged on the resist layer by e-beam direct write in a vector mode. Alternatively, multiple e-beam may be used in the e-beam lithography.

The method 100 may proceed to operation 118 by generating a tape-out of the modified IC design layout 172 for mask making or e-beam writing. The tape-out represents an IC design layout in a format that can be used for mask making or e-beam writing. At this operation, the modified IC design layout 172 may be fractured into a plurality of polygons (or trapezoids). The tape-out is formed based on the modified IC design layout 172 generated in the operation 117.

In one embodiment, the modified IC design layout 172 includes the main features 132 and the dummy features 170. The modified IC design layout is used to form a mask to be used in a photolithography process to transfer the main features to the semiconductor substrate 120. In one example, the dummy features 170 may be sub-resolution features for optical proximity correction (OPC) to enhance the imaging resolution. Those sub-resolution features are nonprintable to the semiconductor substrate 120 by the corresponding photolithography process. In another example, the dummy features 170 are printable features designed to tune the pattern density for improved effect of a manufacturing process, such as CMP or thermal annealing.

In another embodiment, the modified IC pattern 172 is used to directly write the main features 132 to (the e-beam sensitive resist layer coated on) the semiconductor substrate 120 by e-beam in an e-beam lithography process. In the present embodiment, it is advantages to use the e-beam lithography since the e-beam lithography is able to write the resist layer with variable dose in one exposure process.

Other operations may follow. In one embodiment, the method 100 may further proceed to an operation for the fabrication of a mask or a set of masks based on the tape-out of the modified IC design layout 172. In one embodiment, an e-beam or a mechanism of multiple e-beams is used to form a pattern on a mask (photomask or reticle) based on the modified IC pattern. The mask can be formed in various suitable technologies. In one embodiment, the mask is formed using the binary technology. In this case, the mask pattern includes opaque regions and transparent regions. In one example, the binary mask includes a transparent substrate (e.g., fused quartz), and an opaque material (e.g., chromium) coated in the opaque regions of the mask. In another embodiment, the mask is formed using a phase shift technology. In the phase shift mask (PSM), various features in the pattern formed on the mask are configured to have proper phase difference to enhance the resolution and imaging quality. In various examples, the PSM may be an attenuated PSM or an alternating PSM known in the art. In other examples, the mask may be transmissive mask or reflective mask, such as extreme ultraviolet mask (EUV) mask. In furtherance of this embodiment, the semiconductor substrate 120 is fabricated using a mask or a set of masks formed by the above method.

In another embodiment, the tape-out of the modified IC design layout 172 is directly used to pattern the semiconductor substrate 120 by an e-beam direct write (EBDW) lithography apparatus. In this case, the modified IC design layout 172 is defined by various features with respective geometries and exposure doses.

The present disclosure provides an integrated circuit (IC) method that effectively generates dummy features to an IC design layout. The IC method includes various operations to generate space blocks and insert dummy features in the space blocks in various embodiments. Especially, when e-beam lithography exposure process is used for IC patterning, the space blocks in the optimized space block layer are directly used as dummy features. The tape-out data for the e-beam lithography exposure process includes various features defined in both geometry and exposure dose.

Figure 14:
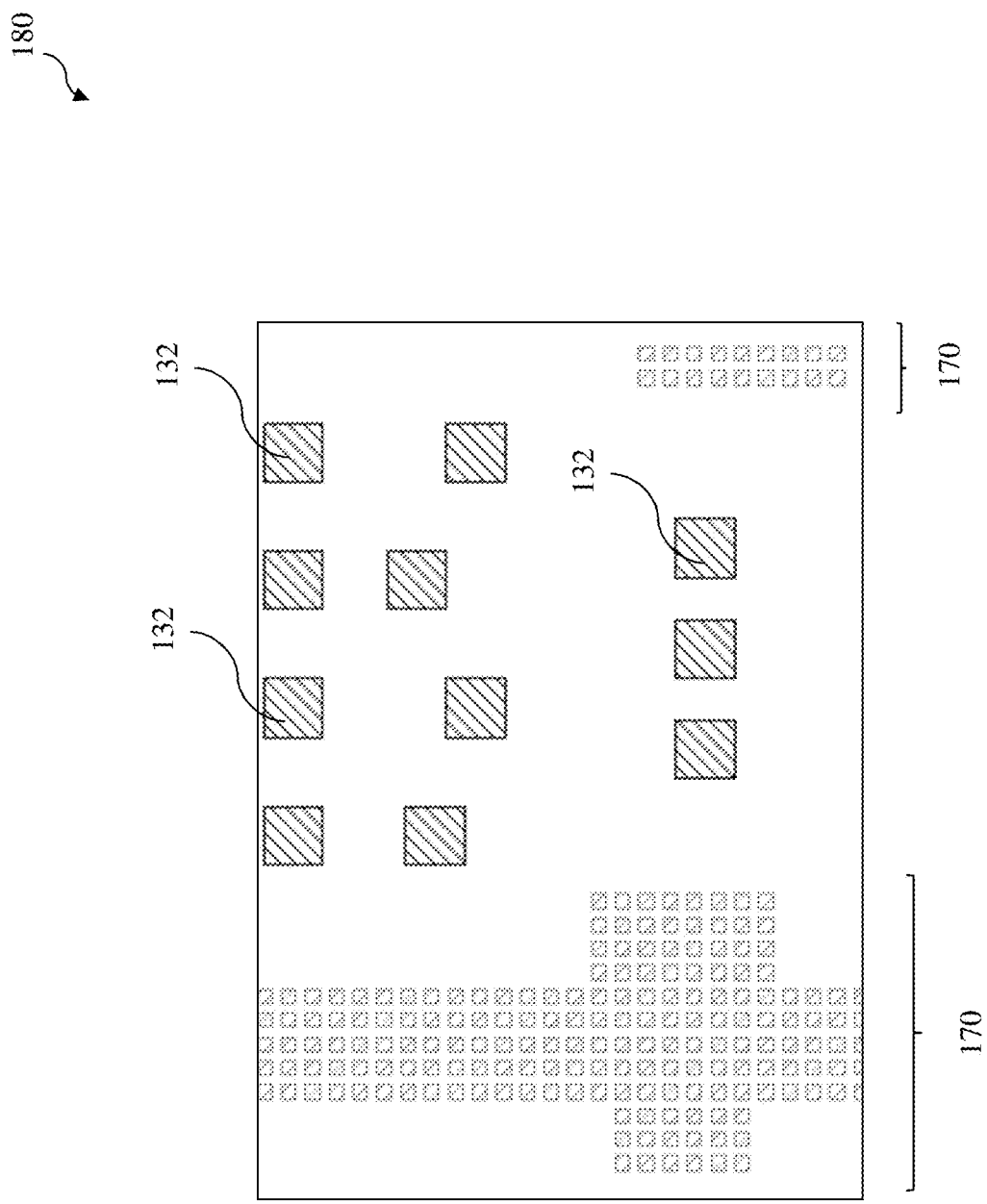
FIGS. 14-15 illustrate an IC design layout with dummy features and space blocks, respectively, constructed according to aspects of the present disclosure.
Figure 15:
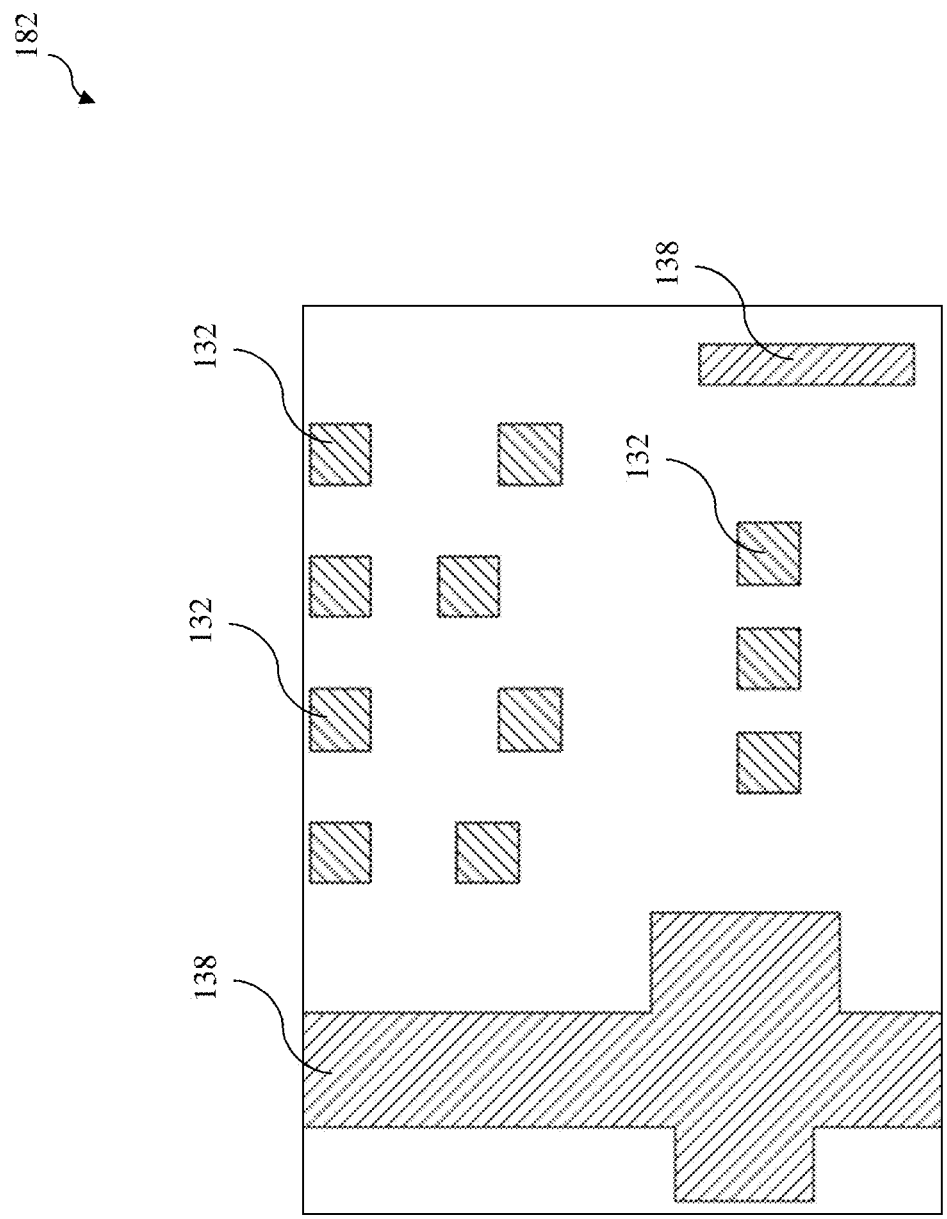

Various advantages of the present disclosure are present in various embodiments as mentioned in the above description. In one example illustrated in FIGS. 14 and 15, the dummy features 170 in FIG. 14 are replaced by space blocks 138 in FIG. 15, the dummy pattern is simplified. By using the space blocks, the time and the cost to calculate and simulate the dummy features are reduced since instead of the dummy features defined in a space block being calculated and simulated but the space block is directly calculated and simulated. For example, when the pattern densities are calculated in the operation 115, the calculation time is much shorter. In another example for e-beam lithography process to pattern the semiconductor substrate, the dummy features are expanded to the space blocks. The e-beam writing dosage to the dummy features during the e-beam lithography process spreads to the space blocks and is reduced. Accordingly, the space charge effect is reduced. In another example, various fabrication processes, such as lithography exposure process and etching, are sensitive to local pattern density variations, causing various deviations, such as CD variations. This is referred to as micro-loading effect. By using the disclosed method, the pattern density variation is reduced and the micro-loading effect is reduced as well.

Thus, the present disclosure provides one embodiment of an integrated circuit (IC) method. The IC method includes receiving an IC design layout including a plurality of main features; choosing isolation distances to the IC design layout; oversizing the main features according to each of the isolation distances; generating a space block layer for the each of the isolation distances by a Boolean operation according to oversized main features; choosing an optimized space block layer and an optimized block dummy density ratio of the IC design layout according to pattern density variation; generating dummy features in the optimized space block layer according to the optimized block dummy density ratio; and forming a tape-out data of the IC design layout including the main features and the dummy features, for IC fabrication.

The present disclosure provides another embodiment of an IC method. The method includes receiving an IC design layout designed to have a plurality of main features to be formed on a semiconductor substrate; choosing isolation distances to the IC design layout; oversizing the main features according to the isolations distances; generating space block layers by a Boolean operation to the IC design layout, wherein each of the space block layers is associated with one of the isolation distances; dividing the semiconductor substrate into a plurality of templates; calculating main pattern density $PD_0$ and dummy pattern density $PD_s$ of the IC design layout to the plurality of templates for the each of the space block layers; calculating a least variation block dummy density ratio (LVBDDR) of the IC design layout for the each of the space block layers according to the main pattern density and the dummy pattern density; choosing an optimized space block layer and an optimized block dummy density ratio according to the LVBDDR; generating a modified IC design layout from the IC design layout according to the optimized space block layer and the optimized block dummy density ratio; and forming a tape-out data of the modified IC design layout for IC fabrication.

The present disclosure also provides another embodiment of an IC method. The method includes receiving an IC design layout having a plurality of main features to be formed on a semiconductor substrate; choosing isolation distances to the IC design layout; oversizing the main features according to the isolations distances; generating space block layers by a Boolean operation to the IC design layout, wherein each of the space block layers is associated with one of the isolation distances; choosing an optimized space block layer and an optimized block dummy density ratio according to a least variation block dummy density ratio (LVBDDR) and process window; and generating dummy features in space blocks of the optimized space block layer according to the optimized block dummy density ratio.

The foregoing has outlined features of several embodiments so that those skilled in the art may better understand the detailed description that follows. Those skilled in the art should appreciate that they may readily use the present disclosure as a basis for designing or modifying other processes and structures for carrying out the same purposes and/or achieving the same advantages of the embodiments disclosed herein. Those skilled in the art should also realize that such equivalent constructions do not depart from the spirit and scope of the present disclosure, and that they may make various changes, substitutions and alterations herein without departing from the spirit and scope of the present disclosure.

What is claimed is:

1. An integrated circuit (IC) method comprising:
    receiving an IC design layout including a plurality of main features;
    choosing isolation distances to the IC design layout;
    oversizing the main features according to the isolation distances;
    generating a space block layer for the isolation distances by a Boolean operation, according to the oversized main features;
    choosing an optimized space block layer and an optimized block dummy density ratio of the IC design layout;
    calculating a least variation block dummy density ratio (LVBDDR) of the IC design layout, wherein the choosing of the optimized space block layer and the optimized block dummy density ratio includes choosing the optimized space block layer and the optimized block dummy density ratio according to the LVBDDR, wherein the calculating of the LVBDDR includes determining the LVBDDR $r_0$ by a formula $$r_0 = (\overline{PD_0 \cdot PD_s} - \overline{PD_0} \cdot \overline{PD_s})/\sigma_s^2,$$

where
$\overline{PD_0}$, is an average of the main pattern density;
$\overline{PD_s}$ is an average of the dummy pattern density; and
$\sigma_s$ is a standard deviation defined by $$\sigma_s^2 = \overline{PD_s^2} - (\overline{PD_s})^2;$$

and generating dummy features in the optimized space block layer according to the optimized block dummy density ratio.

2. The IC method of claim 1, wherein the oversizing the main features includes expanding edges of the main features by one of the isolation distances.

3. The IC method of claim 1, wherein the oversizing the main features includes coalescing a subset of main features into one oversized main feature.

4. The IC method of claim 1, wherein the generating of the space block layer includes defining the space block layer in regions of the IC design layout other than the oversized main features.

5. The IC method of claim 1, wherein the choosing of the optimized space block layer and the optimized block dummy density ratio includes choosing the optimized space block layer and the optimized block dummy density ratio according to the LVBDDR and further according to process window and throughput.

6. The IC method of claim 1, further comprising forming a tape-out data of the IC design layout including the main features and the dummy features, for IC fabrication, and wherein the forming of the tape-out data of the IC design layout includes forming the tape-out data of the IC design layout for mask making.

7. The IC method of claim 1, further comprising forming a tape-out data of the IC design layout including the main features and the dummy features, for IC fabrication, and wherein the tape-out data is used to directly write the main features to an e-beam sensitive resist layer coated on a semiconductor substrate by an e-beam lithography exposing process.

8. The IC method of claim 1, forming a tape-out data of the IC design layout including the main features and the dummy features.

9. An integrated circuit (IC) method comprising:
receiving an IC design layout designed to have a plurality of main features to be formed on a semiconductor substrate;
choosing isolation distances to the IC design layout;
oversizing the main features according to the isolations distances;
generating space block layers by a Boolean operation to the IC design layout, wherein each of the space block layers is associated with one of the isolation distances;
dividing the semiconductor substrate into a plurality of templates;
calculating main pattern density $PD_0$ and dummy pattern density $PD_s$ of the IC design layout to the plurality of templates for each of the space block layers;
calculating a least variation block dummy density ratio (LVBDDR) of the IC design layout for the each of the space block layers according to the main pattern density and the dummy pattern density;
choosing an optimized space block layer and an optimized block dummy density ratio according to the LVBDDR;
generating a modified IC design layout from the IC design layout according to the optimized space block layer and the optimized block dummy density ratio; and
forming a tape-out data of the modified IC design layout for IC fabrication,
wherein the calculating of the LVBDDR includes determining the LVBDDR $r_0$ by a formula $$r_0 = (\overline{PD_0 \cdot PD_s} - \overline{PD_0} \cdot \overline{PD_s})/\sigma_s^2,$$

where
$\overline{PD_0}$ is an average of the main pattern density;
$\overline{PD_s}$ is an average of the dummy pattern density; and
$\sigma_s$ is defined by a formula $$\sigma_s^2 = \overline{PD_s^2} - (\overline{PD_s})^2.$$

10. The IC method of claim 9, wherein $\sigma$ is defined by a formula $$\sigma^2 = \overline{PD^2} - (\overline{PD})^2,$$

where
PD is a total pattern density defined in a formula $$PD = PD_0 + rPD_s \text{ and}$$

r is a block dummy density ratio.

11. The IC method of claim 9, wherein the generating of the space block layer includes generating space blocks in the IC design layout for each of the space block layers according to a corresponding one of the isolation distances.

12. The IC method of claim 11, wherein
the generating of the modified IC design layout includes generating dummy features in space blocks of the optimized space block layer; and
the dummy features has a local dummy pattern density determined by the optimized block dummy density ratio.

13. The IC method of claim 12, wherein the generating of the dummy features in the space blocks of the optimized space block layer includes generating the dummy features of squares with size "a" and configured in an array with a pitch "p" such that a ratio $a^2/p^2$ is equal to the optimized block dummy density ratio.

14. The IC method of claim 12, wherein the generating of the dummy features in the space blocks of the optimized space block layer includes generating the dummy features of rectangles that spans a first dimension "a" in a first direction and a second dimension "b" in a second direction orthogonal to the first direction, wherein the dummy features are configure in an array with a first pitch "$p_x$" in the first direction and a second pitch "$p_y$" in the second direction such that a ratio $ab/p_x p_y$ is equal to the optimized block dummy density ratio.

15. The IC method of claim 9, wherein the isolation distances are greater than or equal to a minimum isolation distance determined by at least one of defect-free process window and design rule.

16. An integrated circuit (IC) method comprising:
receiving an IC design layout having a plurality of main features to be formed on a semiconductor substrate;
choosing isolation distances to the IC design layout;
oversizing the main features according to the isolations distances;
generating space block layers by a Boolean operation to the IC design layout, wherein each of the space block layers is associated with one of the isolation distances;

choosing an optimized space block layer and an optimized block dummy density ratio according to a least variation block dummy density ratio (LVBDDR) and process window; and generating dummy features in the optimized space block layer according to the optimized block dummy density ratio, and wherein the LVBDDR $r_0$ is determined by a formula $$r_0 = (\overline{PD_0 \cdot PD_s} - \overline{PD_0} \cdot \overline{PD_s})/\sigma_s^2,$$

where $PD_0$ is a main pattern density;

$PD_s$ is a dummy pattern density; and $\sigma_s$ is defined by a formula $$\sigma_s^2 = \overline{PD_s^2} - (\overline{PD_s})^2.$$

17. The IC method of claim 16, wherein the generating of the dummy features in the space blocks includes generating the dummy features of squares with size "a" and configured in an array with a pitch "p" such that a ratio $a^2/p^2$ is equal to the optimized block dummy density ratio.

18. The IC method of claim 16, wherein the generating of the dummy features in the space blocks includes generating the dummy features of rectangles that spans a first dimension "a" in a first direction and a second dimension "b" in a second direction orthogonal to the first direction, wherein the dummy features are configured in an array with a first pitch "$p_x$" in the first direction and a second pitch "$p_y$" in the second direction such that a ratio $ab/p_x p_y$ is equal to the optimized block dummy density ratio.

19. The IC method of claim 16, further comprising forming a tape-out data of the IC design layout including the main features and the dummy features.

\* \* \* \* \*